United States Patent
Asai et al.

(10) Patent No.: US 11,139,478 B2
(45) Date of Patent: Oct. 5, 2021

(54) LAMINATE FOR NON-AQUEOUS SECONDARY BATTERY, NON-AQUEOUS SECONDARY BATTERY, AND NON-AQUEOUS SECONDARY BATTERY PRODUCTION METHOD

(71) Applicant: ZEON CORPORATION, Tokyo (JP)

(72) Inventors: Kazuki Asai, Tokyo (JP); Norikazu Yamamoto, Tokyo (JP); Kenji Kuroyanagi, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 78 days.

(21) Appl. No.: 16/629,563

(22) PCT Filed: Jul. 5, 2018

(86) PCT No.: PCT/JP2018/025585
§ 371 (c)(1),
(2) Date: Jan. 9, 2020

(87) PCT Pub. No.: WO2019/017213
PCT Pub. Date: Jan. 24, 2019

(65) Prior Publication Data
US 2020/0176778 A1    Jun. 4, 2020

(30) Foreign Application Priority Data
Jul. 21, 2017    (JP) .............................. JP2017-142196

(51) Int. Cl.
*H01M 4/62*    (2006.01)
*H01M 4/64*    (2006.01)
*H01M 10/0583*    (2010.01)
*H01M 4/02*    (2006.01)

(52) U.S. Cl.
CPC ....... *H01M 4/623* (2013.01); *H01M 10/0583* (2013.01); *H01M 2004/027* (2013.01); *H01M 2004/028* (2013.01)

(58) Field of Classification Search
CPC .......... H01M 4/62; H01M 4/623; H01M 4/60; H01M 10/083
See application file for complete search history.

(56) References Cited

U.S. PATENT DOCUMENTS

| | | | |
|---|---|---|---|
| 7,638,241 B2 | 12/2009 | Sang-Young et al. | |
| 2004/0175626 A1* | 9/2004 | Dasgupta | H01M 50/411 429/309 |
| 2010/0316903 A1* | 12/2010 | Kim | H01M 50/403 429/145 |
| 2012/0028102 A1* | 2/2012 | Ishihara | B01D 71/76 429/145 |
| 2013/0280583 A1* | 10/2013 | Lee | H01M 50/446 429/144 |
| 2013/0302661 A1* | 11/2013 | Kim | H01M 50/449 429/144 |
| 2017/0077478 A1 | 3/2017 | Hiroya et al. | |
| 2020/0052301 A1 | 2/2020 | Kazuki et al. | |

FOREIGN PATENT DOCUMENTS

| | | |
|---|---|---|
| EP | 2485302 A1 | 8/2012 |
| JP | 2013145763 A | 7/2013 |
| JP | 5671208 B2 | 2/2015 |
| JP | 2017054725 A | 3/2017 |
| WO | 2018163969 A1 | 9/2018 |

OTHER PUBLICATIONS

May 10, 2021, the Extended European Search Report issued by the European Patent Office in the corresponding European Patent Application No. 18834457.6.
Oct. 9, 2018, International Search Report issued in the International Patent Application No. PCT/JP2018/025585.
Jan. 21, 2020, International Preliminary Report on Patentability issued in the International Patent Application No. PCT/JP2018/025585.

\* cited by examiner

*Primary Examiner* — Kenneth J Douyette
(74) *Attorney, Agent, or Firm* — Kenja IP Law PC

(57) ABSTRACT

Provided is a laminate for a non-aqueous secondary battery including a substrate and a functional layer that is well adhered thereto. The laminate includes a substrate and a functional layer at one or both sides of the substrate. The functional layer contains non-conductive particles and a binder including a polymer A that includes a fluorine-containing monomer unit. The amount of polymer A in a region up to 20% of thickness of the functional layer from a substrate-side surface thereof is more than 20% and not more than 40% of the total amount of polymer A in the functional layer, and the amount of polymer A in a region up to 20% of thickness of the functional layer from an opposite surface thereof relative to the substrate-side surface is more than 20% and not more than 40% of the total amount of polymer A in the functional layer.

8 Claims, No Drawings

LAMINATE FOR NON-AQUEOUS SECONDARY BATTERY, NON-AQUEOUS SECONDARY BATTERY, AND NON-AQUEOUS SECONDARY BATTERY PRODUCTION METHOD

TECHNICAL FIELD

The present disclosure relates to a laminate for a non-aqueous secondary battery, a non-aqueous secondary battery, and a non-aqueous secondary battery production method.

BACKGROUND

Non-aqueous secondary batteries (hereinafter, also referred to simply as "secondary batteries") such as lithium ion secondary batteries have characteristics such as compact size, light weight, high energy density, and the ability to be repeatedly charged and discharged, and are used in a wide variety of applications. A non-aqueous secondary battery generally includes battery components such as a positive electrode, a negative electrode, and a separator that isolates the positive electrode and the negative electrode from one another and prevents short circuiting between the positive and negative electrodes.

Battery components including functional layers for providing these battery components with desired performance (for example, heat resistance and strength) are used in secondary batteries. Specifically, a separator obtained by forming a functional layer on a separator substrate or an electrode obtained by forming a functional layer on an electrode substrate including an electrode mixed material layer on a current collector may, for example, be used as a battery component. Moreover, there are cases in which a functional layer formed by a porous membrane layer that is obtained by binding non-conductive particles with a binder (binding material) is used as a functional layer that can improve heat resistance, strength, or the like of a battery component.

In recent years, much effort has been focused on enhancing functional layers with the aim of achieving even higher secondary battery performance (for example, refer to Patent Literature (PTL) 1).

In one specific example, PTL 1 discloses that, with respect to a porous active layer (functional layer) containing inorganic substance particles, a first binder polymer, and a second binder polymer, detachment of the inorganic substance particles during assembly of a secondary battery is prevented and safety of the secondary battery is improved when the binder polymer/inorganic substance particle content ratio in a surface section of the layer is higher than that in an inner section of the layer and heterogeneity of composition morphology is provided in the thickness direction.

CITATION LIST

Patent Literature

PTL 1: JP 5671208 B

SUMMARY

Technical Problem

However, there is room for improvement of a battery component including the conventional functional layer described above in terms of improving adhesiveness between the functional layer and a substrate, such as a separator substrate or a battery substrate.

Accordingly, an objective of the present disclosure is to provide a laminate for a non-aqueous secondary battery including a substrate and a functional layer that is well adhered to the substrate.

Another objective of the present disclosure is to provide a non-aqueous secondary battery including a battery component formed by a laminate for a non-aqueous secondary battery in which a substrate and a functional layer are well adhered.

Solution to Problem

The inventors conducted diligent investigation with the aim of solving the problem set forth above. The inventors discovered that by forming a functional layer using a binder that includes a polymer including a fluorine-containing monomer unit and by setting the distribution of the polymer in the functional layer as a specific distribution, the functional layer can be well adhered to a substrate. In this manner, the inventors completed the present disclosure.

Specifically, the present disclosure aims to advantageously solve the problem set forth above by disclosing a laminate for a non-aqueous secondary battery comprising a substrate and a functional layer at one side or both sides of the substrate, wherein the functional layer contains non-conductive particles and a binder, the binder includes a polymer A including a fluorine-containing monomer unit, an amount of the polymer A present in a region up to 20% of thickness of the functional layer from a substrate-side surface of the functional layer is more than 20% and not more than 40% of a total amount of the polymer A present in the functional layer, and an amount of the polymer A present in a region up to 20% of thickness of the functional layer from an opposite surface of the functional layer relative to the substrate-side surface is more than 20% and not more than 40% of the total amount of the polymer A present in the functional layer. When the binder including the polymer A that includes a fluorine-containing monomer unit is used and when the distribution of the polymer A in the functional layer is as set forth above, a laminate for a non-aqueous secondary battery in which the substrate and the functional layer are well adhered is obtained.

In the presently disclosed laminate for a non-aqueous secondary battery, it is preferable that the binder further includes a polymer B including a nitrogen-containing monomer unit, and that an amount of the polymer B present in the region up to 20% of thickness of the functional layer from the opposite surface of the functional layer relative to the substrate-side surface is not less than 20% and not more than 40% of a total amount of the polymer B present in the functional layer. When the polymer B including a nitrogen-containing monomer unit is used and the distribution of the polymer B in the functional layer is as set forth above, the laminate for a non-aqueous secondary battery can be well adhered to another battery component via the functional layer, and blocking of the laminate for a non-aqueous secondary battery (i.e., sticking together of non-aqueous secondary battery laminates via the functional layer) during storage and transport can be inhibited.

In the presently disclosed laminate for a non-aqueous secondary battery, the polymer B preferably includes a (meth)acrylonitrile monomer unit in a proportion of not less than 5 mass % and not more than 60 mass %. When the polymer B includes a (meth)acrylonitrile monomer unit in the proportion set forth above, adhesiveness between the substrate and the functional layer can be further increased, and output characteristics of a non-aqueous secondary battery in which the laminate for a non-aqueous secondary battery is used can be improved.

In the presently disclosed laminate for a non-aqueous secondary battery, the polymer B preferably includes a monomer unit including either or both of an epoxy group and a hydroxy group. When the polymer B includes a monomer unit including either or both of an epoxy group and a hydroxy group, adhesiveness between the substrate and the functional layer can be further increased.

In the presently disclosed laminate for a non-aqueous secondary battery, the functional layer preferably contains not less than 4 parts by mass and not more than 50 parts by mass of the binder per 100 parts by mass of the non-conductive particles. When the content of the binder is within the range set forth above, adhesiveness between the substrate and the functional layer can be sufficiently increased while also inhibiting deterioration of output characteristics of a non-aqueous secondary battery in which the laminate for a non-aqueous secondary battery is used.

In the presently disclosed laminate for a non-aqueous secondary battery, the substrate is preferably a separator substrate. When the substrate is a separator substrate, a laminate for a non-aqueous secondary battery that can suitably be used as a separator is obtained.

Moreover, the present disclosure aims to advantageously solve the problem set forth above by disclosing a non-aqueous secondary battery comprising a positive electrode, a negative electrode, a separator, and an electrolyte solution, wherein at least one of the positive electrode, the negative electrode, and the separator is any one of the laminates for a non-aqueous secondary battery set forth above. When the laminate for a non-aqueous secondary battery set forth above is used for at least one of the battery components (positive electrode, negative electrode, and separator) in this manner, a non-aqueous secondary battery including a battery component in which a substrate and a functional layer are well adhered is obtained.

Furthermore, the present disclosure aims to advantageously solve the problem set forth above by disclosing a non-aqueous secondary battery production method for producing the non-aqueous secondary battery set forth above, comprising adhering the separator to either or both of the positive electrode and the negative electrode using the functional layer. When the separator is adhered to either or both of the positive electrode and the negative electrode using the functional layer in production of a non-aqueous secondary battery in which the laminate for a non-aqueous secondary battery set forth above is used as at least one of the battery components (positive electrode, negative electrode, and separator), a non-aqueous secondary battery in which battery components are well adhered to one another can be obtained.

In the presently disclosed non-aqueous secondary battery production method, the adhering preferably includes either or both of pressing and heating a battery component laminate obtained by stacking the separator and either or both of the positive electrode and the negative electrode such that the opposite surface of the functional layer relative to the substrate-side surface becomes a mating surface. By pressing and/or heating the battery component laminate in which the opposite surface of the functional layer to the substrate-side surface is a mating surface, even better adhesion between battery components can be achieved.

Advantageous Effect

According to the present disclosure, a laminate for a non-aqueous secondary battery including a substrate and a functional layer that is well adhered to the substrate is obtained.

Moreover, according to the present disclosure, a non-aqueous secondary battery including a battery component formed by a laminate for a non-aqueous secondary battery in which a substrate and a functional layer are well adhered is obtained.

DETAILED DESCRIPTION

The following provides a detailed description of embodiments of the present disclosure.

The presently disclosed laminate for a non-aqueous secondary battery is used as a battery component, such as a positive electrode, a negative electrode, or a separator, of a non-aqueous secondary battery. Moreover, the presently disclosed non-aqueous secondary battery includes the presently disclosed laminate for a non-aqueous secondary battery and can be produced, for example, by the presently disclosed non-aqueous secondary battery production method.

(Laminate for Non-Aqueous Secondary Battery)

The presently disclosed laminate for a non-aqueous secondary battery includes a substrate and a functional layer at one side or both sides of the substrate. The presently disclosed laminate for a non-aqueous secondary battery has excellent adhesiveness between the substrate and the functional layer. Moreover, the presently disclosed laminate for a non-aqueous secondary battery is particularly suitable for use as a separator of a non-aqueous secondary battery, but is not specifically limited thereto.

Besides the functional layer, the presently disclosed laminate for a non-aqueous secondary battery may further include any other layer, such as an adhesive layer that does not contain non-conductive particles.

<Substrate>

The substrate is not specifically limited and may be a substrate such as a separator substrate or an electrode substrate that is used in accordance with the application of the laminate for a non-aqueous secondary battery. Specifically, a separator substrate can be used as the substrate in a case in which the laminate for a non-aqueous secondary battery is to be used as a separator, for example. Moreover, an electrode substrate (positive electrode substrate or negative electrode substrate) can be used as the substrate in a case in which the laminate for a non-aqueous secondary battery is to be used as an electrode (positive electrode or negative electrode).

[Separator Substrate]

The separator substrate is not specifically limited and may be a known separator substrate such as an organic separator substrate. An organic separator substrate is a porous member that is formed from an organic material. Examples of such organic separator substrates include a porous resin film or non-woven fabric containing a polyolefin resin such as polyethylene or polypropylene, an aromatic polyamide resin, or the like. Of such organic separator substrates, a porous resin film is preferable as the separator substrate, a porous polyolefin resin film is more preferable as the separator substrate, and a porous polyethylene film is even more preferable as the separator substrate in terms of having excellent strength.

A separator substrate having a functional layer formed at at least one side thereof can be used in the subsequently described non-aqueous secondary battery as a functional layer-equipped separator.

Although the separator substrate may be of any thickness, the thickness thereof is preferably 3 μm or more, and more preferably 5 μm or more, and is preferably 30 μm or less, and more preferably 20 μm or less. A separator substrate thickness that is not less than any of the lower limits set forth above provides sufficient strength. Moreover, a separator substrate thickness that is not more than any of the upper limits set forth above can inhibit reduction of ion conductivity in a secondary battery and enhance output characteristics of the secondary battery.

[Electrode Substrate]

The electrode substrate (positive electrode substrate or negative electrode substrate) is not specifically limited and may, for example, be an electrode substrate obtained by forming an electrode mixed material layer (positive electrode mixed material layer or negative electrode mixed material layer) on a current collector.

Although the following describes, as one example, a case in which the non-aqueous secondary battery is a lithium ion secondary battery, the present disclosure is not limited to the following example.

Note that the current collector, an electrode active material (positive electrode active material or negative electrode active material) and binder for an electrode mixed material layer (binder for a positive electrode mixed material layer or binder for a negative electrode mixed material layer) in the electrode mixed material layer, and the method by which the electrode mixed material layer is formed on the current collector may be known examples thereof such as any of those described in JP 2013-145763 A, for example.

<Functional Layer>

The functional layer at one side or both sides of the substrate can function as a protective layer that improves heat resistance and strength of the laminate for a non-aqueous secondary battery that is used as a battery component. The functional layer may optionally also display a function of adhering a battery component formed by the laminate for a non-aqueous secondary battery to another battery component.

The functional layer contains non-conductive particles and a binder, and may optionally further contain other components. It is a requirement that the functional layer contains a polymer A including a fluorine-containing monomer unit as the binder and that the polymer A contained in the functional layer has a specific distribution from a viewpoint of enabling good adhesion to the substrate.

It should be noted that the functional layer may have a single-layer structure or a multilayer structure.

[Non-Conductive Particles]

Various types of inorganic particles and organic particles that are present stably in the environment of use of a non-aqueous secondary battery and that are electrochemically stable can be used as the non-conductive particles. The non-conductive particles can normally impart heat resistance to the laminate for a non-aqueous secondary battery including the functional layer.

Examples of organic particles that can be used as the non-conductive particles include particles formed from polymers such as polyethylene, polystyrene, polydivinylbenzene, cross-linked styrene-divinylbenzene copolymer, polyimide, polyamide, polyamide-imide, melamine resin, phenolic resin, benzoguanamine-formaldehyde condensate, polysulfone, polyacrylonitrile, polyaramid, polyacetal, and thermoplastic polyimide.

Examples of inorganic particles that can be used as the non-conductive particles include particles of oxides such as aluminum oxide (alumina), hydrate of aluminum oxide (boehmite (AlOOH), gibbsite ($Al(OH)_3$)), silicon oxide, magnesium oxide (magnesia), magnesium hydroxide, calcium oxide, titanium oxide (titania), barium titanate ($BaTiO_3$), ZrO, and alumina-silica composite oxide; particles of nitrides such as aluminum nitride and boron nitride; particles of covalent crystals such as silicon and diamond; particles of sparingly soluble ionic crystals such as barium sulfate, calcium fluoride, and barium fluoride; and fine particles of clays such as talc and montmorillonite. These particles may be subjected to element substitution, surface treatment, solid solution treatment, or the like as necessary.

Of these examples, inorganic particles are preferable as the non-conductive particles, particles of an oxide are more preferable as the non-conductive particles, and alumina is even more preferable as the non-conductive particles.

One of these types of non-conductive particles may be used individually, or two or more of these types of non-conductive particles may be used in combination.

[Binder]

The binder is a component that can hold components such as the non-conductive particles that are contained in the functional layer so that these components do not become detached from the functional layer. The binder of the functional layer in the presently disclosed laminate for a non-aqueous secondary battery is required to include a polymer A including a fluorine-containing monomer unit, and may optionally further include a polymer B including a nitrogen-containing monomer unit and other polymers.

Polymer A

The polymer A includes a fluorine-containing monomer unit and may optionally include a repeating unit (non-fluorine-containing monomer unit) that is derived from a monomer (non-fluorine-containing monomer) that does not contain fluorine. In other words, the polymer A may be a homopolymer or copolymer of one or more fluorine-containing monomers, or may be a copolymer of one or more fluorine-containing monomers and one or more non-fluorine-containing monomers.

If the binder does not include the polymer A, sufficient binding force is not obtained, and adhesiveness between the substrate and the functional layer decreases.

Examples of fluorine-containing monomers that can form a fluorine-containing monomer unit include, but are not specifically limited to, vinylidene fluoride, tetrafluoroethylene, hexafluoropropylene, chlorotrifluoroethylene, vinyl fluoride, trifluoroethylene, chlorotrifluoroethylene, 2,3,3,3-tetrafluoropropene, and perfluoroalkyl vinyl ether. Of these fluorine-containing monomers, vinylidene fluoride and hexafluoropropylene are preferable.

One of these fluorine-containing monomers may be used individually, or two or more of these fluorine-containing monomers may be used in combination.

Examples of non-fluorine-containing monomers that can form a non-fluorine-containing monomer unit include monomers that are copolymerizable with a fluorine-containing monomer and that do not contain fluorine. Specific examples include 1-olefins such as ethylene, propylene, and 1-butene; aromatic vinyl compounds such as styrene, α-methylstyrene, p-t-butylstyrene, vinyltoluene, and chlorostyrene; unsaturated nitrile compounds such as (meth)

acrylonitrile; (meth)acrylic acid ester compounds such as methyl (meth)acrylate, butyl (meth)acrylate, and 2-ethylhexyl (meth)acrylate; amide group-containing unsaturated compounds such as (meth)acrylamide, N-methylol (meth)acrylamide, N-methyl (meth)acrylamide, N-isopropyl (meth)acrylamide, N-tert-butyl (meth)acrylamide, N-phenyl (meth)acrylamide, N-methoxymethyl (meth)acrylamide, N-butoxymethyl (meth)acrylamide, 4-acryloylmorpholine, diacetone (meth)acrylamide, N,N-dimethyl (meth)acrylamide, N,N-diethyl (meth)acrylamide, and 2-(meth)acrylamido-2-methylpropane sulfonic acid; carboxyl group-containing vinyl compounds such as (meth)acrylic acid, itaconic acid, fumaric acid, crotonic acid, and maleic acid; epoxy group-containing unsaturated compounds such as allyl glycidyl ether and glycidyl (meth)acrylate; amino group-containing unsaturated compounds such as dimethylaminoethyl (meth)acrylate and diethylaminoethyl (meth)acrylate; sulfo group-containing unsaturated compounds such as styrene sulfonic acid, vinyl sulfonic acid, and (meth)allyl sulfonic acid; sulfate group-containing unsaturated compounds such as 3-allyloxy-2-hydroxypropane sulfuric acid; and phosphate group-containing unsaturated compounds such as (meth)acrylic acid-3-chloro-2-propyl phosphate and 3-allyloxy-2-hydroxypropane phosphoric acid.

Note that "(meth)acrylonitrile" is used to indicate "acrylonitrile" and/or "methacrylonitrile", "(meth)acryl" is used to indicate "acryl" and/or "methacryl", and "(meth)allyl" is used to indicate "allyl" and/or "methallyl". One of these non-fluorine-containing monomers may be used individually, or two or more of these non-fluorine-containing monomers may be used in combination.

Examples of the polymer A include, but are not specifically limited to, polytetrafluoroethylene, polychlorotrifluoroethylene, polyvinylidene fluoride, polyvinyl fluoride, perfluoroalkoxy fluororesin, tetrafluoroethylene-hexafluoropropylene copolymer, ethylene-tetrafluoroethylene copolymer, ethylene-chlorotrifluoroethylene copolymer, and vinylidene fluoride-hexafluoropropylene copolymer.

Of these examples, polyvinylidene fluoride and polymers including a hexafluoropropylene unit are preferable as the polymer A, and polyvinylidene fluoride and vinylidene fluoride-hexafluoropropylene copolymer are more preferable as the polymer A.

One type of polymer A such as described above may be used individually, or two or more types of polymer A such as described above may be used in combination.

The fractional content of a fluorine-containing monomer unit in the "polymer A" in the present disclosure is normally 70 mass % or more, preferably 80 mass % or more, more preferably 99 mass % or more, and even more preferably 100 mass % (i.e., it is even more preferable that the polymer A is composed of only fluorine-containing monomer units). Put another way, the fractional content of a non-fluorine-containing monomer unit in the "polymer A" is normally 30 mass % or less, preferably 20 mass % or less, more preferably 1 mass % or less, and even more preferably 0 mass % (i.e., it is even more preferable that the polymer A does not include a non-fluorine-containing monomer unit).

The amount of the polymer A that is contained in the functional layer per 100 parts by mass of the non-conductive particles is preferably 4 parts by mass or more, more preferably 10 parts by mass or more, and even more preferably 15 parts by mass or more, and is preferably 50 parts by mass or less, more preferably 40 parts by mass or less, and even more preferably 35 parts by mass or less. Adhesiveness of the functional layer to the substrate can be further increased when the amount of the polymer A is not less than any of the lower limits set forth above. Moreover, the occurrence of blocking during storage or transport with the laminate for a non-aqueous secondary battery in a stacked or wound state can be inhibited and deterioration of output characteristics of a secondary battery in which the laminate for a non-aqueous secondary battery is used can be inhibited when the amount of the polymer A is not more than any of the upper limits set forth above.

The proportion constituted by the polymer A in the binder is preferably 40 mass % or more, and more preferably 45 mass % or more, and is preferably 90 mass % or less, more preferably 75 mass % or less, and even more preferably 60 mass % or less. Adhesiveness of the functional layer to the substrate can be further increased when the proportion constituted by the polymer A is not less than any of the lower limits set forth above. Moreover, the occurrence of blocking during storage or transport with the laminate for a non-aqueous secondary battery in a stacked or wound state can be inhibited when the proportion constituted by the polymer A is not more than any of the upper limits set forth above.

Polymer B

The polymer B includes a nitrogen-containing monomer unit and may optionally further include a repeating unit (non-nitrogen-containing monomer unit) that is derived from a monomer (non-nitrogen-containing monomer) that does not contain nitrogen. In other words, the polymer B may b e a homopolymer or copolymer of one or more nitrogen-containing monomers, or may be a copolymer of one or more nitrogen-containing monomers and one or more non-nitrogen-containing monomers. Moreover, the polymer B may, for example, be cyanoethyl pullulan in which some or all of the hydroxy groups in pullulan are cyanoethylated.

Note that the "polymer B" referred to in the present disclosure mainly includes a repeating unit (non-fluorine-containing monomer unit) that is derived from a monomer (non-fluorine-containing monomer) that does not contain fluorine. Specifically, the fractional content in the "polymer B" of a repeating unit (fluorine-containing monomer unit) that is derived from a monomer (fluorine-containing monomer) containing fluorine is normally 30 mass % or less, preferably 20 mass % or less, more preferably 1 mass % or less, and even more preferably 0 mass % (i.e., it is even more preferable that a fluorine-containing monomer unit is not included).

Examples of nitrogen-containing monomers that can form a nitrogen-containing monomer unit include, but are not specifically limited to, unsaturated nitrile compounds such as (meth)acrylonitrile; amide group-containing unsaturated compounds such as (meth)acrylamide, N-methylol (meth)acrylamide, N-methyl (meth)acrylamide, N-isopropyl (meth)acrylamide, N-tert-butyl (meth)acrylamide, N-phenyl (meth)acrylamide, N-methoxymethyl (meth)acrylamide, N-butoxymethyl (meth)acrylamide, 4-acryloylmorpholine, diacetone (meth)acrylamide, N,N-dimethyl (meth)acrylamide, N,N-di ethyl (meth)acryl amide, 2-(meth)acrylamido-2-methylpropane sulfonic acid, and N-vinyl-2-pyrrolidone; amino group-containing unsaturated compounds such as dimethylaminoethyl (meth)acrylate and diethylaminoethyl (meth)acrylate; and maltotriose in which some hydroxy groups are cyanoethylated. Of these nitrogen-containing monomers, N-vinyl-2-pyrrolidone and (meth)acrylonitrile are preferable, (meth)acrylonitrile is more preferable, and acrylonitrile is even more preferable.

One of these nitrogen-containing monomers may be used individually, or two or more of these nitrogen-containing monomers may be used in combination.

The fractional content of a nitrogen-containing monomer unit in the polymer B is preferably 5 mass % or more, and more preferably 10 mass % or more, and is preferably 60 mass % or less, and more preferably 50 mass % or less. In particular, the fractional content of a (meth)acrylonitrile monomer unit as a nitrogen-containing monomer unit in the polymer B is preferably 5 mass % or more, and more preferably 10 mass % or more, and is preferably 60 mass % or less, and more preferably 50 mass % or less. Output characteristics of a secondary battery in which the laminate for a non-aqueous secondary battery is used can be improved when the fractional content of the (meth)acrylonitrile monomer unit is not less than any of the lower limits set forth above. Moreover, adhesiveness of the functional layer to the substrate can be further increased when the fractional content of the (meth)acrylonitrile monomer unit is not more than any of the upper limits set forth above.

Examples of non-nitrogen-containing monomers that can form a non-nitrogen-containing monomer unit include monomers that are copolymerizable with a nitrogen-containing monomer and that do not contain nitrogen. Specific examples include (meth)acrylic acid alkyl ester monomers, monomers including either or both of an epoxy group and a hydroxy group, and aliphatic conjugated diene monomers. Of these examples, the inclusion of a monomer including either or both of an epoxy group and a hydroxy group as a non-nitrogen-containing monomer is preferable from a viewpoint of further increasing adhesiveness between the substrate and the functional layer. In other words, the polymer B preferably includes a monomer unit including either or both of an epoxy group and a hydroxy group.

One non-nitrogen-containing monomer may be used individually, or two or more non-nitrogen-containing monomers may be used in combination.

The fractional content of a non-nitrogen-containing monomer unit in the polymer B is preferably 40 mass % or more, and more preferably 50 mass % or more, and is preferably 95 mass % or less, and more preferably 90 mass % or less.

Examples of (meth)acrylic acid alkyl ester monomers include monomers that can form a (meth)acrylic acid alkyl ester monomer unit such as acrylic acid alkyl esters (for example, methyl acrylate, ethyl acrylate, n-propyl acrylate, isopropyl acrylate, n-butyl acrylate, t-butyl acrylate, pentyl acrylate, hexyl acrylate, heptyl acrylate, octyl acrylate, 2-ethylhexyl acrylate, nonyl acrylate, decyl acrylate, lauryl acrylate, n-tetradecyl acrylate, and stearyl acrylate) and methacrylic acid alkyl esters (for example, methyl methacrylate, ethyl methacrylate, n-propyl methacrylate, isopropyl methacrylate, n-butyl methacrylate, t-butyl methacrylate, pentyl methacrylate, hexyl methacrylate, heptyl methacrylate, octyl methacrylate, 2-ethylhexyl methacrylate, nonyl methacrylate, decyl methacrylate, lauryl methacrylate, n-tetradecyl methacrylate, and stearyl methacrylate).

Of these (meth)acrylic acid alkyl ester monomers, ethyl acrylate and butyl acrylate are preferable.

Examples of monomers including either or both of an epoxy group and a hydroxy group include monomers that can form a monomer unit including either or both of an epoxy group and a hydroxy group such as unsaturated glycidyl ethers (for example, vinyl glycidyl ether, allyl glycidyl ether, butenyl glycidyl ether, and o-allylphenyl glycidyl ether), monoepoxides of dienes and polyenes (for example, butadiene monoepoxide, chloroprene monoepoxide, 4,5-epoxy-2-pentene, 3,4-epoxy-1-vinylcyclohexene, and 1,2-epoxy-5,9-cyclododecadiene), alkenyl epoxides (for example, 3,4-epoxy-1-butene, 1,2-epoxy-5-hexene, and 1,2-epoxy-9-decene), glycidyl esters of unsaturated carboxylic acids (for example, glycidyl acrylate, glycidyl methacrylate, glycidyl crotonate, glycidyl-4-heptenoate, glycidyl sorbate, glycidyl linoleate, glycidyl-4-methyl-3-pentenoate, glycidyl ester of 3-cyclohexenecarboxylic acid, and glycidyl ester of 4-methyl-3-cyclohexenecarboxylic acid), ethylenically unsaturated alcohols (for example, (meth)allyl alcohol, 3-buten-1-ol, and 5-hexen-1-ol), alkanol esters of ethylenically unsaturated carboxylic acids (for example, 2-hydroxyethyl acrylate (β-hydroxyethyl acrylate), 2-hydroxypropyl acrylate, 2-hydroxyethyl methacrylate, 2-hydroxypropyl methacrylate, di-2-hydroxyethyl maleate, di-4-hydroxybutyl maleate, and di-2-hydroxypropyl itaconate), esters of (meth)acrylic acid and polyalkylene glycol represented by a general formula $CH_2=CR^1—COO—(C_qH_{2q}O)_p—H$ (where p represents an integer of 2 to 9, q represents an integer of 2 to 4, and $R^1$ represents hydrogen or a methyl group), mono(meth)acrylic acid esters of dihydroxy esters of dicarboxylic acids (for example, 2-hydroxyethyl-2'-(meth)acryloyloxy phthalate and 2-hydroxyethyl-2'-(meth)acryloyloxy succinate), vinyl ethers (for example, 2-hydroxyethyl vinyl ether and 2-hydroxypropyl vinyl ether), mono(meth)allyl ethers of alkylene glycols (for example, (meth)allyl-2-hydroxyethyl ether, (meth)allyl-2-hydroxypropyl ether, (meth)allyl-3-hydroxypropyl ether, (meth)allyl-2-hydroxybutyl ether, (meth)allyl-3-hydroxybutyl ether, (meth)allyl-4-hydroxybutyl ether, and (meth)allyl-6-hydroxyhexyl ether), polyoxyalkylene glycol mono(meth)allyl ethers (for example, diethylene glycol mono(meth)allyl ether and dipropylene glycol mono(meth)allyl ether), mono(meth)allyl ethers of halogen or hydroxy substituted (poly)alkylene glycols (for example, glycerin mono(meth)allyl ether, (meth)allyl-2-chloro-3-hydroxypropyl ether, and (meth)allyl-2-hydroxy-3-chloropropyl ether), mono(meth)allyl ethers of polyhydric phenols (for example, eugenol and isoeugenol) and halogen substituted products thereof, and (meth)allyl thioethers of alkylene glycols (for example, (meth)allyl-2-hydroxyethyl thioether and (meth)allyl-2-hydroxypropyl thioether).

Of these monomers including either or both of an epoxy group and a hydroxy group, epoxy group-containing monomers such as unsaturated glycidyl ethers, monoepoxides of dienes and polyenes, alkenyl epoxides, and glycidyl esters of unsaturated carboxylic acids are preferable, and allyl glycidyl ether and glycidyl methacrylate are more preferable.

Note that "(meth)acryloyl" is used to indicate "acryloyl" and/or "methacryloyl".

Examples of aliphatic conjugated diene monomers include monomers that can form an aliphatic conjugated diene monomer unit such as 1,3-butadiene, 2-methyl-1,3-butadiene (isoprene), 2,3-dimethyl-1,3-butadiene, 2-ethyl-1,3-butadiene, 1,3-pentadiene, and 3-chloro-1,3-butadiene.

Of these aliphatic conjugated diene monomers, 1,3-butadiene is preferable.

The polymer B may include a structural unit that is obtained through hydrogenation of an aliphatic conjugated diene monomer unit by any method (i.e., a hydrogenated aliphatic conjugated diene unit).

The amount of the polymer B contained in the functional layer per 100 parts by mass of the non-conductive particles is preferably 5 parts by mass or more, and more preferably 15 parts by mass or more, and is preferably 40 parts by mass or less, and more preferably 25 parts by mass or less. Output characteristics of a secondary battery in which the laminate for a non-aqueous secondary battery is used can be enhanced when the amount of the polymer B is not less than any of the lower limits set forth above. Moreover, the occurrence of blocking during storage or transport with the laminate for a non-aqueous secondary battery in a stacked or wound state can be inhibited when the amount of the polymer B is not more than any of the upper limits set forth above.

The proportion constituted by the polymer B in the binder is preferably 10 mass % or more, more preferably 25 mass % or more, and even more preferably 40 mass % or more, and is preferably 60 mass % or less, and more preferably 55 mass % or less. Output characteristics of a secondary battery in which the laminate for a non-aqueous secondary battery is used can be enhanced when the proportion constituted by the polymer B is not less than any of the lower limits set forth above. Moreover, the occurrence of blocking during storage or transport with the laminate for a non-aqueous secondary battery in a stacked or wound state can be inhibited when the proportion constituted by the polymer B is not more than any of the upper limits set forth above.

Other Polymers

Examples of other polymers that can be used include any polymer that does not correspond to the polymer A and the polymer B described above and that can be used as a binder of a functional layer. Specific examples of other polymers include, but are not specifically limited to, polyacrylic acid, polyvinyl alcohol, polyethylene oxide, polypropylene oxide, polymethyl methacrylate, styrene-butadiene random copolymer and hydrogenated product thereof, styrene-butadiene block copolymer and hydrogenated product thereof, styrene-isoprene block copolymer and hydrogenated product thereof, and pullulan.

The amount of other polymers contained in the functional layer per 100 parts by mass of the non-conductive particles is preferably 0 parts by mass to 40 parts by mass, more preferably 25 parts by mass or less, and even more preferably 5 parts by mass or less.

The proportion constituted by other polymers in the binder is preferably 0 mass % to 60 mass %, more preferably 10 mass % or less, and even more preferably 5 mass % or less.

Production Method of Polymers

The polymers described above that can be used as the binder can be produced by known polymerization methods and polymerization reactions without any specific limitations. Any polymerization method may be used, such as solution polymerization, suspension polymerization, bulk polymerization, or emulsion polymerization. Moreover, the polymerization reaction may be addition polymerization such as ionic polymerization, radical polymerization, or living radical polymerization. The polymerization may be carried out with a commonly used emulsifier, dispersant, polymerization initiator, chain transfer agent, or the like that are usable for polymerization, and the amount thereof may also be the same as commonly used.

Amount of Binder

The amount of the binder contained in the functional layer per 100 parts by mass of the non-conductive particles is preferably 4 parts by mass or more, more preferably 20 parts by mass or more, and even more preferably 35 parts by mass or more, and is preferably 50 parts by mass or less, and more preferably 45 parts by mass or less. Adhesiveness of the functional layer to the substrate can be further increased when the amount of the binder is not less than any of the lower limits set forth above. Moreover, deterioration of output characteristics of a secondary battery in which the laminate for a non-aqueous secondary battery is used can be inhibited when the amount of the binder is not more than any of the upper limits set forth above.

[Other Components]

The laminate for a non-aqueous secondary battery may contain other optional components besides the components described above. Commonly known examples of such other components can be used without any specific limitations so long as the battery reactions are not affected. Moreover, one of these other components may be used individually, or two or more of these other components may be used in combination.

Examples of other components that can be used include known additives such as viscosity modifiers, wetting agents, and additives for electrolyte solution.

[Distribution of Polymers]

In the functional layer containing the components described above, the polymer A contained as the binder is required to have a specific distribution in the functional layer.

The distribution of a polymer in a functional layer referred to herein can be determined by, for example, measuring a thickness direction distribution by glow discharge optical emission spectroscopy or the like for a characteristic element of the polymer (i.e., an element that among elements included in components contained in the functional layer, is an element that is only contained by the polymer). In the case of a polymer that does not include a characteristic element, the distribution of the polymer can be determined by, for example, electron probe microanalyzer (EPMA) observation of a cross-section of the functional layer that is stained with osmium.

Distribution of Polymer A

Specifically, the distribution of the polymer A contained as the binder is required to be such that the amount of the polymer A present in a region up to 20% of thickness of the functional layer from a substrate-side surface of the functional layer is more than 20% and not more than 40% of the total amount of the polymer A present in the functional layer.

In addition, the distribution of the polymer A is required to be such that the amount of the polymer A present in a region up to 20% of thickness of the functional layer from an opposite surface of the functional layer relative to the substrate-side surface is more than 20% and not more than 40% of the total amount of the polymer A present in the functional layer.

If the distribution of the polymer A in the functional layer does not satisfy the distribution set forth above, adhesiveness between the substrate and the functional layer cannot be sufficiently increased.

Although it is not clear why good adhesion between the substrate and the functional layer is possible when the distribution of the polymer A is as set forth above, it is presumed that as a result of the polymer A, which has excellent binding force, concentrating in a specific proportion at both surfaces of the functional layer, binding force at an interface between the substrate and the functional layer can be increased through polymer A concentrated at the substrate side, and the functional layer can be provided with an appropriate rigidity distribution.

The amount of the polymer A present in the region up to 20% of the thickness of the functional layer from the substrate-side surface of the functional layer is preferably not less than 25% and not more than 35% of the total amount of the polymer A present in the functional layer. Adhesiveness between the substrate and the functional layer can be further increased when the amount of the polymer A is not less than the lower limit set forth above. Moreover, the laminate for a non-aqueous secondary battery can be well adhered to another battery component via the functional layer when the amount of the polymer A is not more than the upper limit set forth above.

The amount of the polymer A present in the region up to 20% of the thickness of the functional layer from the opposite surface of the functional layer to the substrate-side surface is preferably not less than 25% and not more than 35% of the total amount of the polymer A present in the functional layer. The laminate for a non-aqueous secondary battery can be well adhered to another battery component via the functional layer when the amount of the polymer A is not less than the lower limit set forth above. Moreover, the occurrence of blocking during storage or transport with the laminate for a non-aqueous secondary battery in a stacked or wound state can be inhibited when the amount of the polymer A is not more than the upper limit set forth above.

Distribution of Polymer B

The functional layer preferably contains the polymer B in addition to the polymer A. In a case in which the functional layer contains the polymer B, the amount of the polymer B present in the region up to 20% of thickness of the functional layer from the opposite surface of the functional layer to the substrate-side surface is preferably 20% or more, more preferably more than 20%, and even more preferably 25% or more of the total amount of the polymer B present in the functional layer, and is preferably 40% or less, and more preferably 35% or less of the total amount of the polymer B present in the functional layer. The laminate for a non-aqueous secondary battery can be well adhered to another battery component via the functional layer when the amount of the polymer B is not less than any of the lower limits set forth above. Moreover, the occurrence of blocking during storage or transport with the laminate for a non-aqueous secondary battery in a stacked or wound state can be inhibited when the amount of the polymer B is not more than any of the upper limits set forth above.

Method of Distribution Adjustment

The distribution of a polymer in the functional layer can be adjusted by, for example, altering the chemical composition and content of the polymer, the formation method and formation conditions of the functional layer, and so forth. Moreover, the distribution of a polymer in the functional layer can be adjusted by providing the functional layer with a multilayer structure and by causing the layers to have different chemical compositions. Specifically, the distribution of a polymer in the functional layer can be adjusted by, for example, setting the drying temperature in formation of the functional layer as not lower than 40° C. and not higher than 60° C., or performing drying three times with different temperatures, but is not specifically limited to being adjusted in this manner.

[Production Method of Laminate for Non-Aqueous Secondary Battery]

The presently disclosed laminate for a non-aqueous secondary battery can be obtained by forming the functional layer at one side or both sides of the substrate by a known technique. Specifically, the laminate for a non-aqueous secondary battery can be produced using a slurry obtained by dissolving or dispersing the above-described components of the functional layer (non-conductive particles, binder, and other optional components) in a dispersion medium such as water or an organic solvent.

Examples of methods by which the slurry can be used to form the functional layer on the substrate include, but are not specifically limited to, (i) a method in which the slurry is applied onto the substrate and the applied slurry is subsequently dried to form the functional layer, and (ii) a method in which the slurry is applied onto the substrate and the substrate having the slurry applied thereon is subsequently immersed in a coagulation liquid so as to coagulate the slurry and form the functional layer. Of these methods, method (i) is preferable from a viewpoint of good and simple formation of the desired functional layer.

Note that acetone is preferably used as the dispersion medium in formation of the functional layer by method (i). The method of drying may, for example, be drying with warm air, infrared irradiation, or the like. The drying temperature may be not lower than 25° C. and not higher than 100° C., and preferably not lower than 40° C. and not higher than 60° C. Examples of methods by which the slurry can be applied include, but are not specifically limited to, gravure coating, dip coating, and wire bar coating. The application rate may, for example, be not less than 3 m/min and not more than 200 m/min. Moreover, the solid content concentration of the applied slurry is preferably not less than 5 mass % and not more than 50 mass %. Furthermore, the functional layer that is formed may be irradiated with steam.

N,N-dimethylacetamide or N-methyl-2-pyrrolidone is preferably used as the dispersion medium in formation of the functional layer by method (ii). Moreover, water, warm water, methanol, or ethanol is preferably used as the coagulation liquid.

(Non-Aqueous Secondary Battery)

The presently disclosed non-aqueous secondary battery includes a positive electrode, a negative electrode, a separator, and an electrolyte solution, wherein at least one of the positive electrode, the negative electrode, and the separator is the presently disclosed laminate for a non-aqueous secondary battery. In other words, the presently disclosed non-aqueous secondary battery includes at least one of: a positive electrode including a positive electrode substrate and the functional layer set forth above (laminate for a non-aqueous secondary battery in which the substrate is a positive electrode substrate); a negative electrode including a negative electrode substrate and the functional layer set forth above (laminate for a non-aqueous secondary battery in which the substrate is a negative electrode substrate); and a separator including a separator substrate and the functional layer set forth above (laminate for a non-aqueous secondary battery in which the substrate is a separator substrate). The presently disclosed non-aqueous secondary battery normally has a structure in which the electrolyte solution and battery components such as the positive electrode, the negative electrode, and the separator are hermetically housed inside any casing. The presently disclosed non-aqueous secondary battery can display excellent performance as a result of the laminate for a non-aqueous secondary battery set forth above, which has excellent adhesiveness between the substrate and the functional layer, being used as at least one battery component.

<Positive Electrode, Negative Electrode, and Separator>

At least one of the positive electrode, the negative electrode, and the separator of the presently disclosed non-aqueous secondary battery is the presently disclosed laminate for a non-aqueous secondary battery. In other words, one battery component or two battery components selected from the group consisting of the positive electrode, the negative electrode, and the separator may be formed by components other than the presently disclosed laminate for a non-aqueous secondary battery. A positive electrode, negative electrode, or separator that is formed by a component other than the presently disclosed laminate for a non-aqueous secondary battery is not specifically limited and may be an electrode (positive electrode or negative electrode) formed by an electrode substrate (positive electrode substrate or negative electrode substrate), an electrode (positive electrode or negative electrode) including a functional layer other than the specific functional layer set forth above on an electrode substrate, a separator formed by a separator substrate, a separator including a functional layer other than the specific functional layer set forth above on a separator substrate, or the like.

<Electrolyte Solution>

The electrolyte solution is normally an organic electrolyte solution obtained by dissolving a supporting electrolyte in an organic solvent. The supporting electrolyte may, for example, be a lithium salt in the case of a lithium ion secondary battery. Examples of lithium salts that can be used include $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)NLi$. Of these lithium salts, $LiPF_6$, $LiClO_4$, and $CF_3SO_3Li$ are preferred as they readily dissolve in solvents and exhibit a high degree of dissociation. One electrolyte may be used individually, or two or more electrolytes may be used in combination. In general, lithium ion conductivity tends to increase when a supporting electrolyte having a high degree of dissociation is used. Therefore, lithium ion conductivity can be adjusted through the type of supporting electrolyte that is used.

No specific limitations are placed on the organic solvent used in the electrolyte solution other than being an organic solvent in which the supporting electrolyte can dissolve. Examples of suitable organic solvents in the case of a lithium ion secondary battery, for example, include carbonates such as dimethyl carbonate (DMC), ethylene carbonate (EC), diethyl carbonate (DEC), propylene carbonate (PC), butylene carbonate (BC), and methyl ethyl carbonate (MEC); esters such as γ-butyrolactone and methyl formate; ethers such as 1,2-dimethoxyethane and tetrahydrofuran; and sulfur-containing compounds such as sulfolane and dimethyl sulfoxide. Furthermore, a mixture of these solvents may be used. Of these solvents, carbonates are preferable due to having a high permittivity and a wide stable potential region. In general, lithium ion conductivity tends to increase when a solvent having a low viscosity is used. Therefore, lithium ion conductivity can be adjusted through the type of solvent that is used.

The concentration of the electrolyte in the electrolyte solution may be adjusted as appropriate. Moreover, known additives such as vinylene carbonate, fluoroethylene carbonate, and ethyl methyl sulfone may be added to the electrolyte solution.

(Production Method of Non-Aqueous Secondary Battery)

The presently disclosed non-aqueous secondary battery production method is a method of producing the presently disclosed non-aqueous secondary battery set forth above and includes a step of adhering the separator to either or both of the positive electrode and the negative electrode using the functional layer set forth above. In other words, the presently disclosed non-aqueous secondary battery production method includes a step of adhering battery components that are each formed by the presently disclosed laminate for a non-aqueous secondary battery, or adhering a battery component formed by the presently disclosed laminate for a non-aqueous secondary battery and a battery component formed by a component other than the presently disclosed laminate for a non-aqueous secondary battery, using the functional layer included in the presently disclosed laminate for a non-aqueous secondary battery that is used as a battery component. The presently disclosed non-aqueous secondary battery production method normally further includes a step of assembling a secondary battery after the adhering.

The presently disclosed non-aqueous secondary battery production method can provide a secondary battery in which battery components are well adhered as a result of including a step of adhering the separator to either or both of the positive electrode and the negative electrode via the functional layer.

<Adhering>

The adhering of the separator to either or both of the positive electrode and the negative electrode can be performed by any method that can be used to adhere battery components using a functional layer without any specific limitations other than that the functional layer of the presently disclosed laminate for a non-aqueous secondary battery is used. In other words, the adhering may be performed by utilizing the functional layer to paste together a separator formed by the presently disclosed laminate for a non-aqueous secondary battery and a positive electrode and/or negative electrode formed by the presently disclosed laminate for a non-aqueous secondary battery; a separator formed by a component other than the presently disclosed laminate for a non-aqueous secondary battery and a positive electrode and/or negative electrode formed by the presently disclosed laminate for a non-aqueous secondary battery; or a separator formed by the presently disclosed laminate for a non-aqueous secondary battery and a positive electrode and/or negative electrode formed by a component other than the presently disclosed laminate for a non-aqueous secondary battery.

In particular, from a viewpoint of achieving even better adhesion between battery components, it is preferable that the adhering is performed by either or both of pressing and heating a battery component laminate obtained by stacking the separator and either or both of the positive electrode and the negative electrode such that the opposite surface of the functional layer relative to the substrate-side surface becomes a mating surface.

[Battery Component Laminate]

The structure of the battery component laminate is not specifically limited and may, for example, be any of those listed below in (1) to (15). Note that in (1) to (15), "Positive electrode", "Negative electrode", and "Separator" respectively indicate a positive electrode, a negative electrode, and a separator that are each formed by a component other than the presently disclosed laminate for a non-aqueous secondary battery.

(1) Positive electrode substrate/Functional layer/Separator (2) Positive electrode/Functional layer/Separator substrate (3) Positive electrode substrate/Functional layer/Functional layer/Separator substrate (4) Negative electrode substrate/Functional layer/Separator (5) Negative electrode/Functional layer/Separator substrate (6) Negative electrode substrate/Functional layer/Functional layer/Separator substrate (7) Positive electrode substrate/Functional layer/Separator/Functional layer/Negative electrode substrate (8) Positive electrode substrate/Functional layer/Separator substrate/Functional layer/Negative electrode (9) Positive electrode substrate/Functional layer/Functional layer/Separator substrate/Functional layer/Negative electrode

(10) Positive electrode substrate/Functional layer/Functional layer/Separator substrate/Functional layer/Negative electrode substrate

(11) Positive electrode substrate/Functional layer/Separator substrate/Functional layer/Functional layer/Negative electrode substrate

(12) Positive electrode substrate/Functional layer/Functional layer/Separator substrate/Functional layer/Functional layer/Negative electrode substrate

(13) Positive electrode/Functional layer/Separator substrate/Functional layer/Negative electrode substrate

(14) Positive electrode/Functional layer/Separator substrate/Functional layer/Functional layer/Negative electrode substrate

(15) Positive electrode/Functional layer/Separator substrate/Functional layer/Negative electrode

[Pressing and/or Heating]

Pressing of the battery component laminate can be performed without any specific limitations using a known press such as a flat plate press or a roll press, for example. In this pressing, the pressure may be not less than 1 MPa and not more than 10 MPa, for example, and the pressing time may be not less than 1 second and not more than 3 minutes, for example.

The heating of the battery component laminate can be performed without any specific limitations using a known heater, for example. The temperature during heating may be not lower than 40° C. and not higher than 150° C., for example.

The adhering is preferably performed through at least pressing of the battery component laminate, and is more preferably performed through pressing and heating of the battery component laminate. Although it is possible to perform pressing and heating simultaneously, to perform heating after pressing, or to perform pressing after heating, it is preferable that pressing and heating are performed simultaneously from a viewpoint of operational efficiency and from a viewpoint of achieving even better adhesion between battery components.

<Assembly>

Assembly of the secondary battery can be carried out by, for example, performing rolling, folding, or the like, as necessary, of an adhered body obtained by adhering the positive electrode, the negative electrode, and the separator to one another or an overlapped body obtained by, with respect to an adhered body obtained by adhering the separator to one of the electrodes (positive electrode or negative electrode), overlapping the other electrode (negative electrode or positive electrode not adhered to the separator) at the separator-side of the adhered body, placing the resultant product inside a casing, injecting the electrolyte solution into the casing, and sealing the casing to thereby produce the secondary battery. An expanded metal, an overcurrent preventing device such as a fuse or a PTC device, a lead plate, or the like may be placed in the casing as necessary in order to prevent pressure increase inside the battery and the occurrence of overcharging or overdischarging. The shape of the battery may, for example, be a coin type, a button type, a sheet type, a cylinder type, a prismatic type, a flat type, or the like.

EXAMPLES

The following provides a more specific description of the present disclosure based on examples. However, the present disclosure is not limited to the following examples. In the following description, "%" and "parts" used in expressing quantities are by mass, unless otherwise specified.

Moreover, in the case of a polymer that is produced through copolymerization of a plurality of types of monomers, the proportion constituted by a monomer unit in the polymer that is formed through polymerization of a given monomer is normally, unless otherwise specified, the same as the ratio (charging ratio) of the given monomer among all monomers used in polymerization of the polymer.

In the examples and comparative examples, the following methods were used to calculate and evaluate the distribution of a polymer in a functional layer, the peel strength, electrode adhesiveness, and blocking resistance of a laminate for a non-aqueous secondary battery, and the output characteristics of a secondary battery.

<Distribution of Polymer>

A Marcus-type radiofrequency glow discharge optical emission surface profiler (GD-Profiler 2 produced by Horiba, Ltd.) was used to perform depth direction compositional analysis under the following conditions with respect to a functional layer of a functional layer-equipped separator (laminate for a non-aqueous secondary battery) that had been produced.

<Analysis Conditions>

Neon gas pressure: 300 Pa
RF power: 35 W
Analysis mode: Pulse mode 1,000 Hz; Duty ratio=0.50
Anode diameter (analysis diameter): 4 mm
Measured elements: H, C, N, O, F, Al An optical emission intensity profile was obtained in which the element concentration was reflected by the vertical axis with sputtering time on the horizontal axis. Note that since the optical emission intensity varies depending on the sputtering rate of the measurement sample and the detection wavelength (element), the optical emission intensity does not in that form indicate a quantitative value for the element. Therefore, appropriate arithmetic processing was performed for the optical emission intensity of each element so as to display a profile for the element in an easily comparable form. Specifically, in this measurement, arithmetic processing was performed by a factor of $1/5$ for the optical emission intensity of Al and a factor of 20 for the optical emission intensities of F and N, and smoothing processing was performed for the profiles of F and N.

Among components contained in the functional layer, a polymer A was the only component that included F and a polymer B was the only component that included N. Therefore, the distribution of polymer A was determined from the obtained F profile and the distribution of the polymer B was determined from the obtained N profile.

Also note that the position of a functional layer/substrate interface was determined based on the obtained C profile. Specifically, a first half section of optical emission intensity peaks attributed to the substrate and a section attributed to the functional layer in the C profile were each linearly approximated, and the position of a sputtering time corresponding to the point of intersection of these lines was defined as the position of the functional layer/substrate interface.

<Peel Strength>

A rectangular test specimen of 100 mm (length)×10 mm (width) was cut out from a functional layer-equipped separator (laminate for a non-aqueous secondary battery) that had been produced. In addition, cellophane tape was secured to a test stage in advance. Tape prescribed by JIS Z1522 was used as the cellophane tape.

The test specimen that had been cut out from the separator was affixed to the cellophane tape with the functional layer thereof facing downward. Thereafter, one end of the separator was pulled in a vertical direction at a pulling speed of 100 mm/min to peel off the separator, and the stress during this pulling was measured. This measurement was performed three times. An average value of the measured stress was calculated and was taken to be the peel strength of the functional layer. This value was evaluated by the following standard. A larger peel strength indicates better adhesion between the functional layer and the substrate.

A: Peel strength of 100 N/m or more
B: Peel strength of not less than 80 N/m and less than 100 N/m
C: Peel strength of less than 80 N/m <Electrode Adhesiveness>

A functional layer-equipped separator (laminate for a non-aqueous secondary battery) that had been produced was cut out to 10 mm (width)×50 mm (length). A positive electrode and the functional layer-equipped separator that had been cut out were stacked such that the positive electrode mixed material layer-side and the functional layer-side faced one another and were pressed for 10 seconds at a temperature of 70° C. and a pressure of 5 MPa using a flat plate press to obtain a test specimen. The obtained test specimen was placed with the surface at the current collector-side of the positive electrode facing downward, and cellophane tape was affixed to the surface at the current collector-side of the positive electrode. Tape prescribed by JIS Z1522 was used as the cellophane tape. Also note that the cellophane tape was secured to a horizontal test stage in advance. Thereafter, one end of the separator was pulled vertically upward at a pulling speed of 50 mm/min to peel off the separator, and the stress during this pulling was measured. This measurement was performed three times. An average value of the stress was determined as the adhesion strength (N/m) and was used to evaluate electrode adhesiveness of the laminate for a non-aqueous secondary battery by the following standard. Larger adhesion strength indicates better adhesion between the positive electrode and the separator via the functional layer and higher adhesiveness between battery components using the functional layer.

A: Adhesion strength of 25 N/m or more
B: Adhesion strength of not less than 10 N/m and less than 25 N/m
C: Adhesion strength of less than 10 N/m <Blocking Resistance>

Two square pieces were obtained by cutting out squares of 5 cm (width)×5 cm (length) from a functional layer-equipped separator (laminate for a non-aqueous secondary battery) that had been produced. Next, the two square pieces were overlapped with the functional layers thereof facing one another, were placed under pressing of 10 g/cm² at a temperature of 40° C., and were left for 24 hours to prepare a test specimen in a pressed state (pressed test specimen). The state of adhesion between the two overlapped square pieces was observed by eye in the pressed test specimen that had been left for 24 hours, and blocking resistance was evaluated by the following standard. In a case in which the two overlapped square pieces were adhered to one another, the whole of one of the two square pieces was secured in place and the other of the square pieces was pulled with a force of 0.3 N/m to confirm whether the square pieces could be peeled apart. A lower degree of adhesion between the two overlapped square pieces indicates that the laminate for a non-aqueous secondary battery has better blocking resistance.

A: Two square pieces are not adhered to one another
B: Two square pieces are adhered to one another but can be peeled apart by pulling
C: Two square pieces are adhered to one another and cannot be peeled apart by pulling <Output Characteristics>

A laminate (single layer laminate) lithium ion secondary battery of 40 mAh in capacity that had been produced was left for 24 hours in an environment having a temperature of 25° C. Thereafter, the lithium ion secondary battery was subjected to an operation of charging for 5 hours at a charge rate of 0.1 C in an environment having a temperature of 25° C., and the voltage V0 at the end of charging was measured. The lithium ion secondary battery was then subjected to an operation of discharging at a discharge rate of 1 C in an environment having a temperature of −10° C., and the voltage V1 at 15 seconds after the start of discharging was measured. The voltage change ΔV (mV) of the secondary battery was determined by the following formula.

$$\text{Voltage change } \Delta V \text{ (mV)} = V0 - V1$$

Output characteristics of the secondary battery were evaluated by the following standard using the determined value of ΔV. A smaller voltage change ΔV indicates that the secondary battery has better output characteristics.

A: Voltage change ΔV of less than 350 mV
B: Voltage change ΔV of not less than 350 mV and less than 500 mV
C: Voltage change ΔV of 500 mV or more Example 1

<Preparation of Polymer A>

A vinylidene fluoride-hexafluoropropylene copolymer (PVdF-HFP; ratio of hexafluoropropylene: 5 mass %) was prepared as a polymer A.

<Production of Polymer B>

An autoclave equipped with a stirrer was charged with 164 parts of deionized water, 15 parts of acrylonitrile (AN) as a nitrogen-containing monomer, 80 parts of ethyl acrylate (EA) as a (meth)acrylic acid alkyl ester monomer, 5 parts of allyl glycidyl ether (AGE) as an epoxy group-containing monomer, 0.3 parts of potassium persulfate as a polymerization initiator, and 1.2 parts of sodium polyoxyethylene alkyl ether sulfate as an emulsifier. These materials were sufficiently stirred, and then a polymerization reaction was carried out for 5 hours at a reaction temperature of 80° C. to yield a water dispersion of a polymer B.

Note that the solid content concentration of the obtained water dispersion of the polymer B was 37.3%, and the polymerization conversion rate calculated from the solid content concentration was 96%.

<Production of Polymer Solution>

The water dispersion of the polymer B obtained as described above was dried in an environment having an absolute humidity of 50% and a temperature of 23° C. to 25° C. so as to prepare a polymer B film of 3±0.3 mm in thickness. The prepared polymer B film was then cut into 5 mm squares to prepare a plurality of film pieces. The cut film pieces were loaded into a glass bottle with acetone as an organic solvent such that the solid content concentration was 10% and were mixed using a Mix Rotor (rotation speed: 100 rpm). Mixing was performed until the polymer B dissolved in the organic solvent (i.e., until undissolved matter of the polymer B could not be seen by eye) to obtain a polymer B solution.

A polymer solution containing the polymer A and the polymer B was then produced by mixing 20 parts in terms of solid content (polymer B) of the polymer B solution obtained as described above and 20 parts in terms of solid content of the vinylidene fluoride-hexafluoropropylene copolymer prepared as the polymer A.

<Production of Slurry Composition for Functional Layer>

A slurry composition for a functional layer having a solid content concentration of 15% was obtained by loading 100 parts of alumina (produced by Sumitomo Chemical Co., Ltd.; product name: AKP3000; median particle diameter (D50): 0.7 μm) as non-conductive particles, 40 parts in terms of solid content of the polymer solution obtained as described above, and 714 parts of acetone as a dispersion medium into a bead mill and performing dispersing treatment thereof for 2 hours.

<Production of Functional Layer-Equipped Separator>

A separator substrate (made from polyethylene; thickness: 12 μm) was immersed for 5 seconds in the slurry composition for a functional layer obtained as described above in an environment having a temperature of 25° C., and was then pulled out of the slurry composition for a functional layer. Through this operation, the slurry composition was applied at both sides of the separator substrate. The applied slurry composition was dried for 3 minutes in an environment having a temperature of 50° C. to obtain, as a laminate for a non-aqueous secondary battery, a functional layer-equipped separator (thickness: 20 μm) including a functional layer of 4 μm in thickness formed at both sides thereof. The functional layer-equipped separator including a functional layer at both sides was used to produce a secondary battery as described further below.

Separately to the above, the slurry composition for a functional layer obtained as described above was applied at one side of a separator substrate (made from polyethylene; thickness: 12 μm) using a wire bar, and then the applied slurry composition was dried for 3 minutes in an environment having a temperature of 50° C. to obtain, as a laminate for a non-aqueous secondary battery, a functional layer-equipped separator (thickness: 16 μm) including a functional layer of 4 μm in thickness at only one side thereof.

The functional layer-equipped separator that had been provided with a functional layer at only one side was used to measure and evaluate the distribution of polymers in the functional layer, and the peel strength, electrode adhesiveness, and blocking resistance of the laminate for a non-aqueous secondary battery. The results are shown in Table 1.

<Production of Positive Electrode>

Mixing was performed of 100 parts of $LiCoO_2$ (volume-average particle diameter D50: 12 μm) as a positive electrode active material, 2 parts of acetylene black (produced by Denka Company Limited; product name: HS-100) as a conductive material, and 2 parts in terms of solid content of polyvinylidene fluoride (produced by Kureha Corporation; product name: #7208) as a binder for a positive electrode. N-methyl-2-pyrrolidone was added to adjust the total solid content concentration to 70 mass %. These materials were mixed using a planetary mixer to produce a slurry composition for a positive electrode.

A comma coater was used to apply the obtained slurry composition for a positive electrode onto aluminum foil (current collector) of 20 μm in thickness such as to have a thickness of approximately 150 μm after drying. The slurry composition was dried by conveying the aluminum foil inside a 60° C. oven for 2 minutes at a speed of 0.5 m/min. Thereafter, heat treatment was performed for 2 minutes at a temperature of 120° C. to obtain a pre-pressing positive electrode web. The obtained pre-pressing positive electrode web was rolled by roll pressing to obtain a post-pressing positive electrode (single-sided positive electrode) having a positive electrode active material layer thickness of 80 μm.

<Production of Negative Electrode>

A 5 MPa pressure vessel equipped with a stirrer was charged with 33 parts of 1,3-butadiene, 3.5 parts of itaconic acid, 63.5 parts of styrene, 0.4 parts of sodium dodecylbenzenesulfonate as an emulsifier, 150 parts of deionized water, and 0.5 parts of potassium persulfate as a polymerization initiator. These materials were sufficiently stirred and were then heated to 50° C. to initiate polymerization. The reaction was terminated by cooling at the point at which the polymerization conversion rate reached 96% to yield a mixture containing a particulate binder (styrene-butadiene copolymer; SBR) for a negative electrode. The mixture containing the binder for a negative electrode was adjusted to pH 8 through addition of 5% sodium hydroxide aqueous solution and was then subjected to thermal-vacuum distillation to remove unreacted monomer. Thereafter, the mixture was cooled to 30° C. or lower to obtain a water dispersion containing the binder for a negative electrode.

Next, 100 parts of artificial graphite (volume-average particle diameter D50: 15.6 μm) as a negative electrode active material was added to 1 part in terms of solid content of a 2% aqueous solution of a sodium salt of carboxymethyl cellulose (MAC350HC produced by Nippon Paper Industries Co., Ltd.) as a thickener, the solid content concentration was adjusted to 68% with deionized water, and mixing was performed for 60 minutes at a temperature of 25° C. The solid content concentration was further adjusted to 62% with deionized water and a further 15 minutes of mixing was performed at 25° C. Next, 1.5 parts in terms of solid content of the binder for a negative electrode described above was added to the resultant mixture, the final solid content concentration was adjusted to 52% with deionized water, and a further 10 minutes of mixing was performed. The resultant mixture was subjected to a defoaming process under reduced pressure to yield a slurry composition for a negative electrode having good fluidity.

A comma coater was used to apply the obtained slurry composition for a negative electrode onto copper foil (current collector) of 20 μm in thickness such as to have a thickness of approximately 150 μm after drying. The slurry composition was dried by conveying the copper foil inside a 60° C. oven for 2 minutes at a speed of 0.5 m/min. Thereafter, heat treatment was performed for 2 minutes at a temperature of 120° C. to obtain a pre-pressing negative electrode web. The obtained pre-pressing negative electrode web was rolled by roll pressing to obtain a post-pressing negative electrode (single-sided negative electrode) having a negative electrode mixed material layer thickness of 80 μm.

<Production of Lithium Ion Secondary Battery>

A square of 4 cm×4 cm was cut out from the post-pressing positive electrode obtained as described above. The post-pressing negative electrode was cut out as 4.2 cm×4.2 cm. In addition, the functional layer-equipped separator including a functional layer at both sides that was obtained as described above was cut out as 5 cm×5 cm. Next, the functional layer-equipped separator that had been cut out was positioned on the positive electrode mixed material layer of the post-pressing positive electrode that had been cut out. The post-pressing negative electrode that had been cut out was then positioned on the surface of the functional layer-equipped separator that was not in contact with the positive electrode such that the negative electrode mixed material layer of the negative electrode and the functional layer of the functional layer-equipped separator faced one another, to thereby obtain a battery component laminate (positive electrode/functional layer/separator substrate/functional layer/negative electrode). The obtained battery component laminate was pressed at a temperature of 70° C. and a pressure of 5 MPa to cause good adhesion between the layers of the battery component laminate using the functional layer.

The resultant adhered body was then enclosed in an aluminum packing case serving as a battery case, and electrolyte solution (solvent: ethylene carbonate (EC)/diethyl carbonate (DEC)/vinylene carbonate (VC) (volume ratio=68.5/30/1.5); electrolyte: $LiPF_6$ of 1 mol/L in concentration) was injected such that no air remained. Next, an opening of the aluminum packing case was heat sealed at a temperature of 150° C. to tightly close the aluminum packing case and thereby produce a laminate lithium ion secondary battery of 40 mAh in capacity.

Output characteristics of the obtained lithium ion secondary battery were evaluated by the previously described method. The results are shown in Table 1.

Example 2

Preparation of a polymer A, production of a polymer B, production of a polymer solution, production of a slurry composition for a functional layer, production of a functional layer-equipped separator, production of a positive electrode, production of a negative electrode, and production of a lithium ion secondary battery were carried out in the same way as in Example 1 with the exception that in production of the polymer B, 5 parts of glycidyl methacrylate (GMA) was used instead of 5 parts of allyl glycidyl ether (AGE) and 80 parts of butyl acrylate (BA) was used instead of 80 parts of ethyl acrylate (EA). The various measurements and evaluations were also carried out in the same way as in Example 1. The results are shown in Table 1.

Example 3

Preparation of a polymer A, production of a polymer solution, production of a slurry composition for a functional layer, production of a functional layer-equipped separator, production of a positive electrode, production of a negative electrode, and production of a lithium ion secondary battery were carried out in the same way as in Example 1 with the exception that a polymer B produced as described below was used. The various measurements and evaluations were also carried out in the same way as in Example 1. The results are shown in Table 1.
<Production of Polymer B>

An autoclave equipped with a stirrer was charged with 240 parts of deionized water, 2.5 parts of sodium alkyl benzenesulfonate as an emulsifier, 36.2 parts of acrylonitrile (AN) as a nitrogen-containing monomer, and 0.45 parts of t-dodecyl mercaptan as a chain transfer agent in this order. After the inside of the autoclave had been purged with nitrogen, 63.8 parts of 1,3-butadiene (BD) as an aliphatic conjugated diene monomer was fed into the autoclave under pressure, 0.25 parts of ammonium persulfate was added as a polymerization initiator, and a polymerization reaction was carried out at a reaction temperature of 40° C. Through this reaction, a copolymer of acrylonitrile and 1,3-butadiene was obtained. The polymerization conversion rate was 85%.

Deionized water was added to the resultant copolymer to obtain a solution adjusted to a total solid content concentration of 12%. An autoclave equipped with a stirrer and having a capacity of 1 L was charged with 400 mL (total solid content: 48 g) of the obtained solution, and dissolved oxygen in the solution was removed by passing nitrogen gas for 10 minutes. Thereafter, 75 mg of palladium acetate as a hydrogenation reaction catalyst was dissolved in 180 mL of deionized water to which nitric acid had been added in an amount of 4 molar equivalents of the palladium (Pd), and the resultant solution was added into the autoclave. The system was purged twice with hydrogen gas, and then the contents of the autoclave were heated to 50° C. in a state in which the pressure was increased to 3 MPa with hydrogen gas, and a hydrogenation reaction (first stage hydrogenation reaction) was performed for 6 hours.

The autoclave was subsequently returned to atmospheric pressure. Then, 25 mg of palladium acetate as a hydrogenation reaction catalyst was dissolved in 60 mL of deionized water to which nitric acid had been added in an amount of 4 molar equivalents of the Pd, and the resultant solution was added into the autoclave. The system was purged twice with hydrogen gas, and then the contents of the autoclave were heated to 50° C. in a state in which the pressure was increased to 3 MPa with hydrogen gas, and a hydrogenation reaction (second stage hydrogenation reaction) was performed for 6 hours.

Next, the contents of the autoclave were returned to normal temperature and the system was changed to a nitrogen atmosphere. Thereafter, the contents were concentrated to a solid content concentration of 40% using an evaporator to yield a water dispersion of a copolymer.

The water dispersion of the copolymer was dripped into methanol to coagulate the copolymer, and then a coagulated material of the copolymer was vacuum dried for 12 hours in an environment having a temperature of 60° C. to obtain a polymer B.

Example 4

Production of a slurry composition for a functional layer and production of a functional layer-equipped separator were carried out as described below without carrying out production of a polymer B and production of a polymer solution, and using commercially available polyvinyl pyrrolidone (produced by Nippon Shokubai Co., Ltd.) as a polymer B. With the exception of the above, preparation of a polymer A, production of a positive electrode, production of a negative electrode, and production of a lithium ion secondary battery were carried out in the same way as in Example 1. The various measurements and evaluations were also carried out in the same way as in Example 1. The results are shown in Table 1.
<Production of Slurry Composition for Functional Layer>

A slurry composition for a functional layer having a solid content concentration of 20% was obtained by loading 100 parts of alumina (produced by Sumitomo Chemical Co., Ltd.; product name: AKP3000; median particle diameter (D50): 0.7 μm) as non-conductive particles, 30 parts of the polymer A, 7 parts of polyvinyl pyrrolidone as the polymer B, and 548 parts of dimethylacetamide as a dispersion medium into a bead mill and performing dispersing treatment thereof for 2 hours.
<Production of Functional Layer-Equipped Separator>

A separator substrate (made from polyethylene; thickness: 12 μm) was immersed for 5 seconds in the slurry composition for a functional layer obtained as described above in an environment having a temperature of 25° C., and was then pulled out of the slurry composition for a functional layer.

Through this operation, the slurry composition was applied at both sides of the separator substrate. The separator substrate onto which the slurry composition had been applied was immersed for 3 seconds in 50° C. warm water, and was subsequently pulled out of the warm water and was dried for 10 minutes in a 60° C. safety oven to obtain, as a laminate for a non-aqueous secondary battery, a functional layer-equipped separator (thickness: 20 µm) including a functional layer of 4 µm in thickness formed at both sides thereof. The functional layer-equipped separator including a functional layer at both sides was used in secondary battery production.

Separately to the above, the slurry composition for a functional layer obtained as described above was applied at one side of a separator substrate (made from polyethylene; thickness: 12 µm) by a wire bar. The separator substrate having the slurry composition applied thereon was immersed for 3 seconds in 50° C. warm water, and was subsequently pulled out of the warm water and was dried for 10 minutes in a 60° C. safety oven to obtain, as a laminate for a non-aqueous secondary battery, a functional layer-equipped separator (thickness: 16 µm) including a functional layer of 4 µm in thickness at only one side.

Example 5

Preparation of a polymer A, production of a polymer B, production of a positive electrode, production of a negative electrode, and production of a lithium ion secondary battery were carried out in the same way as in Example 1 with the exception that N-methyl-2-pyrrolidone was used instead of acetone in production of a polymer solution and production of a slurry composition for a functional layer, and production of a functional layer-equipped separator was carried out as described below. The various measurements and evaluations were also carried out in the same way as in Example 1. The results are shown in Table 1.
<Production of Functional Layer-Equipped Separator>

A separator substrate (made from polyethylene; thickness: 12 µm) was immersed for 5 seconds in the slurry composition for a functional layer in an environment having a temperature of 25° C., and was then pulled out of the slurry composition for a functional layer. Through this operation, the slurry composition was applied at both sides of the separator substrate. The separator substrate to which the slurry composition had been applied was immersed for 3 seconds in 50° C. warm water, and was subsequently pulled out of the warm water and was dried for 10 minutes in a 60° C. safety oven to obtain, as a laminate for a non-aqueous secondary battery, a functional layer-equipped separator (thickness: 20 µm) including a functional layer of 4 µm in thickness formed at both sides thereof. The functional layer-equipped separator including a functional layer at both sides was used in secondary battery production.

Separately to the above, the slurry composition for a functional layer was applied at one side of a separator substrate (made from polyethylene; thickness: 12 µm) by a wire bar. The separator substrate having the slurry composition applied thereon was immersed for 3 seconds in 50° C. warm water, and was subsequently pulled out of the warm water and was dried for 10 minutes in a 60° C. safety oven to obtain, as a laminate for a non-aqueous secondary battery, a functional layer-equipped separator (thickness: 16 µm) including a functional layer of 4 µm in thickness at only one side.

Comparative Example 1

Production of a slurry composition for a functional layer and production of a functional layer-equipped separator were carried out as described below without carrying out production of a polymer B and production of a polymer solution. With the exception of the above, preparation of a polymer A, production of a positive electrode, production of a negative electrode, and production of a lithium ion secondary battery were carried out in the same way as in Example 1. The various measurements and evaluations were also carried out in the same way as in Example 1. The results are shown in Table 1.
<Production of Slurry Composition for Functional Layer>

A slurry composition for a functional layer having a solid content concentration of 20% was obtained by loading 100 parts of alumina (produced by Sumitomo Chemical Co., Ltd.; product name: AKP3000; median particle diameter (D50): 0.7 µm) as non-conductive particles, 32 parts of the polymer A, and 500 parts of N-methyl-2-pyrrolidone as a dispersion medium into a bead mill and performing dispersing treatment thereof for 2 hours.
<Production of Functional Layer-Equipped Separator>

A separator substrate (made from polyethylene; thickness: 12 µm) was immersed for 5 seconds in the slurry composition for a functional layer obtained as described above in an environment having a temperature of 25° C., and was then pulled out of the slurry composition for a functional layer. Through this operation, the slurry composition was applied at both sides of the separator substrate. The applied slurry composition was dried for 3 minutes in an environment having a temperature of 70° C. to obtain, as a laminate for a non-aqueous secondary battery, a functional layer-equipped separator (thickness: 20 µm) including a functional layer of 4 µm in thickness formed at both sides thereof. The functional layer-equipped separator including a functional layer at both sides was used in secondary battery production.

Separately to the above, the slurry composition for a functional layer obtained as described above was applied at one side of a separator substrate (made from polyethylene; thickness: 12 µm) by a wire bar and the applied slurry composition was dried for 3 minutes in an environment having a temperature of 70° C. to obtain, as a laminate for a non-aqueous secondary battery, a functional layer-equipped separator (thickness: 16 µm) including a functional layer of 4 µm in thickness at only one side thereof.

Comparative Example 2

A slurry composition for a functional layer was produced as described below without carrying out production of a polymer B and production of a polymer solution, and using cyanoethyl pullulan (produced by Shin-Etsu Chemical Co., Ltd.; substitution ratio: 80 mol %) as a polymer B. With the exception of the above, preparation of a polymer A, production of a functional layer-equipped separator, production of a positive electrode, production of a negative electrode, and production of a lithium ion secondary battery were carried out in the same way as in Example 1. The various measurements and evaluations were also carried out in the same way as in Example 1. The results are shown in Table 1.
<Production of Slurry Composition for Functional Layer>

A slurry composition for a functional layer having a solid content concentration of 20% was obtained by loading 100 parts of alumina (produced by Sumitomo Chemical Co., Ltd.; product name: AKP3000; median particle diameter (D50): 0.7 µm) as non-conductive particles, 30 parts of the polymer A, 2 parts of cyanoethyl pullulan as the polymer B, and 528 parts of acetone as a dispersion medium into a bead mill and performing dispersing treatment thereof for 2 hours.

TABLE 1

| | | | | | Example 1 | Example 2 | Example 3 | Example 4 | Example 5 | Comparative Example 1 | Comparative Example 2 |
|---|---|---|---|---|---|---|---|---|---|---|---|
| Functional layer | Non-conductive particles | Type | | | Alumina | Alumina | Alumina | Alumina | Alumina | Alumina | Alumina |
| | | Content [parts by mass] | | | 100 | 100 | 100 | 100 | 100 | 100 | 100 |
| | Binder | Polymer A | Type | | PVdF-HFP | PVdF-HFP | PVdF-HFP | PVdF-HFP | PVdF-HFP | PVdF-HFP | PVdF-HFP |
| | | | Content [parts by mass] | | 20 | 20 | 20 | 30 | 20 | 32 | 30 |
| | | | Amount present in region up to 20% of functional layer thickness from opposite surface to substrate-side surface [mass %] | | 30 | 30 | 30 | 35 | 35 | 20 | 33 |
| | | | Amount present in region up to 20% of functional layer thickness from substrate-side surface [mass %] | | 30 | 30 | 22 | 23 | 22 | 20 | 18 |
| | | Polymer B | Synthetic substance | Chemical composition | | | | | | | |
| | | | | AN [mass %] | 15 | 15 | 36.2 | — | 15 | — | — |
| | | | | AGE [mass %] | 5 | — | — | — | 5 | — | — |
| | | | | GMA [mass %] | — | 5 | — | — | — | — | — |
| | | | | EA [mass %] | 80 | — | — | — | 80 | — | — |
| | | | | BA [mass %] | — | 80 | — | — | — | — | — |
| | | | | BD + hydrogenated BD [mass %] | — | — | 63.8 | — | — | — | — |
| | | | Content [parts by mass] | | 20 | 20 | 20 | — | 20 | — | — |
| | | | Polyvinylpyrrolidone [parts by mass] | | — | — | — | 7 | — | — | — |
| | | | Cyanoethyl pullulan [parts by mass] | | — | — | — | — | — | — | 2 |
| | | | Amount present in region up to 20% of functional layer thickness from opposite surface to substrate-side surface [mass %] | | 27 | 27 | 30 | 22 | 22 | — | 18 |
| | | | Content [parts by mass] | | 40 | 40 | 40 | 37 | 40 | 32 | 32 |
| Evaluation | Peel strength | | | | A | A | B | B | B | C | C |
| | Electrode adhesiveness | | | | A | A | A | B | B | C | B |
| | Blocking resistance | | | | A | A | B | A | A | B | A |
| | Output characteristics | | | | A | A | A | B | A | C | A |

It can be seen from Table 1 that the functional layer-equipped separator (laminate for a non-aqueous secondary battery) in each of Examples 1 to 5 had excellent adhesiveness (peel strength) between the separator substrate and the functional layer.

INDUSTRIAL APPLICABILITY

According to the present disclosure, a laminate for a non-aqueous secondary battery including a substrate and a functional layer that is well adhered to the substrate is obtained.

Moreover, according to the present disclosure, a non-aqueous secondary battery including a battery component formed by a laminate for a non-aqueous secondary battery in which a substrate and a functional layer are well adhered is obtained.

The invention claimed is:

1. A laminate for a non-aqueous secondary battery comprising a substrate and a functional layer at one side or both sides of the substrate, wherein the functional layer contains non-conductive particles and a binder, the binder includes a polymer A including a fluorine-containing monomer unit and a polymer B including a nitrogen-containing monomer unit, an amount of the polymer A present in a region up to 20% of thickness of the functional layer from a substrate-side surface of the functional layer is more than 20% and not more than 40% of a total amount of the polymer A present in the functional layer, an amount of the polymer A present in a region up to 20% of thickness of the functional layer from an opposite surface of the functional layer relative to the substrate-side surface is more than 20% and not more than 40% of the total amount of the polymer A present in the functional layer, and an amount of the polymer B present in the region up to 20% of thickness of the functional layer from the opposite surface of the functional layer relative to the substrate-side surface is not less than 20% and not more than 40% of a total amount of the polymer B present in the functional layer.

2. The laminate for a non-aqueous secondary battery according to claim 1, wherein the polymer B includes a (meth)acrylonitrile monomer unit in a proportion of not less than 5 mass % and not more than 60 mass %.

3. The laminate for a non-aqueous secondary battery according to claim 1, wherein the polymer B includes a monomer unit including either or both of an epoxy group and a hydroxy group.

4. The laminate for a non-aqueous secondary battery according to claim 1, wherein the functional layer contains not less than 4 parts by mass and not more than 50 parts by mass of the binder per 100 parts by mass of the non-conductive particles.

5. The laminate for a non-aqueous secondary battery according to claim 1, wherein the substrate is a separator substrate.

6. A non-aqueous secondary battery comprising a positive electrode, a negative electrode, a separator, and an electrolyte solution, wherein
at least one of the positive electrode, the negative electrode, and the separator is the laminate for a non-aqueous secondary battery according to claim 1.

7. A non-aqueous secondary battery production method for producing the non-aqueous secondary battery according to claim 6, comprising adhering the separator to either or both of the positive electrode and the negative electrode using the functional layer.

8. The non-aqueous secondary battery production method according to claim 7, wherein the adhering includes either or both of pressing and heating a battery component laminate obtained by stacking the separator and either or both of the positive electrode and the negative electrode such that the opposite surface of the functional layer relative to the substrate-side surface becomes a mating surface.

* * * * *